(12) United States Patent
Engel et al.

(10) Patent No.: US 7,180,950 B2
(45) Date of Patent: Feb. 20, 2007

(54) LOW-NOISE FEEDBACK CANCELLATION FILTER FOR ENHANCED COMMON-MODE REJECTION AND NOISE IMMUNITY

(75) Inventors: Andy Engel, Portola Valley, CA (US); Janet L. Yun, Santa Clara, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 768 days.

(21) Appl. No.: 10/286,545

(22) Filed: Nov. 1, 2002

(65) Prior Publication Data
US 2004/0086052 A1 May 6, 2004

(51) Int. Cl.
*H04B 3/00* (2006.01)
*H04L 25/00* (2006.01)

(52) U.S. Cl. ............... 375/257; 375/258; 375/216; 375/217; 375/219

(58) Field of Classification Search ........... 375/257, 375/258, 216
See application file for complete search history.

(56) References Cited

U.S. PATENT DOCUMENTS

| | | | | |
|---|---|---|---|---|
| 3,747,028 A | * | 7/1973 | Pennypacker | 333/112 |
| 4,189,681 A | * | 2/1980 | Lawson et al. | 330/109 |
| 4,614,914 A | * | 9/1986 | Hofer | 330/149 |
| 4,621,241 A | * | 11/1986 | Kiser | 331/117 R |
| 5,774,505 A | * | 6/1998 | Baugh | 375/348 |
| 5,978,690 A | * | 11/1999 | Das et al. | 455/574 |
| 5,994,998 A | * | 11/1999 | Fisher et al. | 375/258 |

* cited by examiner

*Primary Examiner*—Chieh M. Fan
*Assistant Examiner*—Anna Ziskind

(57) ABSTRACT

A circuit is connected between a module and a pair of wires. The circuit includes a first connection line, a second connection line, radio frequency termination circuitry, a first transformer, a second transformer, a tapped inductance and a feedback cancellation filter. The first connection line is for connection to a first wire in the pair of wires. The second connection line is for connection to a second wire in the pair of wires. The radio frequency termination circuitry is connected between the first connection line and the second connection line. The first transformer has a first inductance and a second inductance. A first end of the first inductance is coupled to the first connection line. A first end of the second inductance is coupled to the second connection line. The second transformer includes a first inductance and a second inductance. The first inductance of the second transformer is coupled between a second end of the first inductance of the first transformer and a second end of the second inductance of the first transformer. The second inductance of the second transformer includes a tap line. The feedback cancellation filter is coupled to the second transformer, the first connection line and the second connection line.

22 Claims, 3 Drawing Sheets

LOW-NOISE FEEDBACK CANCELLATION FILTER FOR ENHANCED COMMON-MODE REJECTION AND NOISE IMMUNITY

BACKGROUND

The present invention pertains to network connectors and pertains particularly to a low-noise feedback cancellation filter used to enhance common-mode rejection and noise immunity.

When two host systems are communicating via a cable, each host system typically includes a transceiver that converts electrical signals received from the host system to signals that are suitable for the cable. Each transceiver also converts signals received from the cable to electrical signals usable by the host system.

Transceivers used for systems that transfer signals over copper cable must achieve good signal integrity while meeting transmission distance and performance requirements. Signals received by a transceiver have noise from several sources. The sources of noise include ambient noise and crosstalk. Ambient noise is coupled into unshielded twisted pairs (UTPs) of copper cable as they run through noisy environments. Crosstalk occurs as a result of signal leakage across adjacent twisted wire pairs. Additionally, noise can be generated at the signal source. The noise typically shows up equally on both lines of a twisted pair, so the noise can be considered an imbalance, or common-mode component, in what is ideally a purely differential signal. Noise suppression elements are usually present in the front end of the receiver portion of a transceiver. For example, many RJ45 jacks have built-in common-mode chokes and bypass elements.

SUMMARY OF THE INVENTION

In accordance with a preferred embodiment of the present invention, a circuit is connected between a module and a pair of wires. The circuit includes a first connection line, a second connection line, radio frequency termination circuitry, a first transformer, a second transformer, a tapped inductance and a feedback cancellation filter. The first connection line is for connection to a first wire in the pair of wires. The second connection line is for connection to a second wire in the pair of wires. The radio frequency termination circuitry is connected between the first connection line and the second connection line. The first transformer has a first inductance and a second inductance. A first end of the first inductance is coupled to the first connection line. A first end of the second inductance is coupled to the second connection line. The second transformer includes a first inductance and a second inductance. The first inductance of the second transformer is coupled between a second end of the first inductance of the first transformer and a second end of the second inductance of the first transformer. The second inductance of the second transformer includes a tap line. The feedback cancellation filter is coupled to the second transformer, the first connection line and the second connection line.

DESCRIPTION OF THE PRIOR ART

Figure 1:
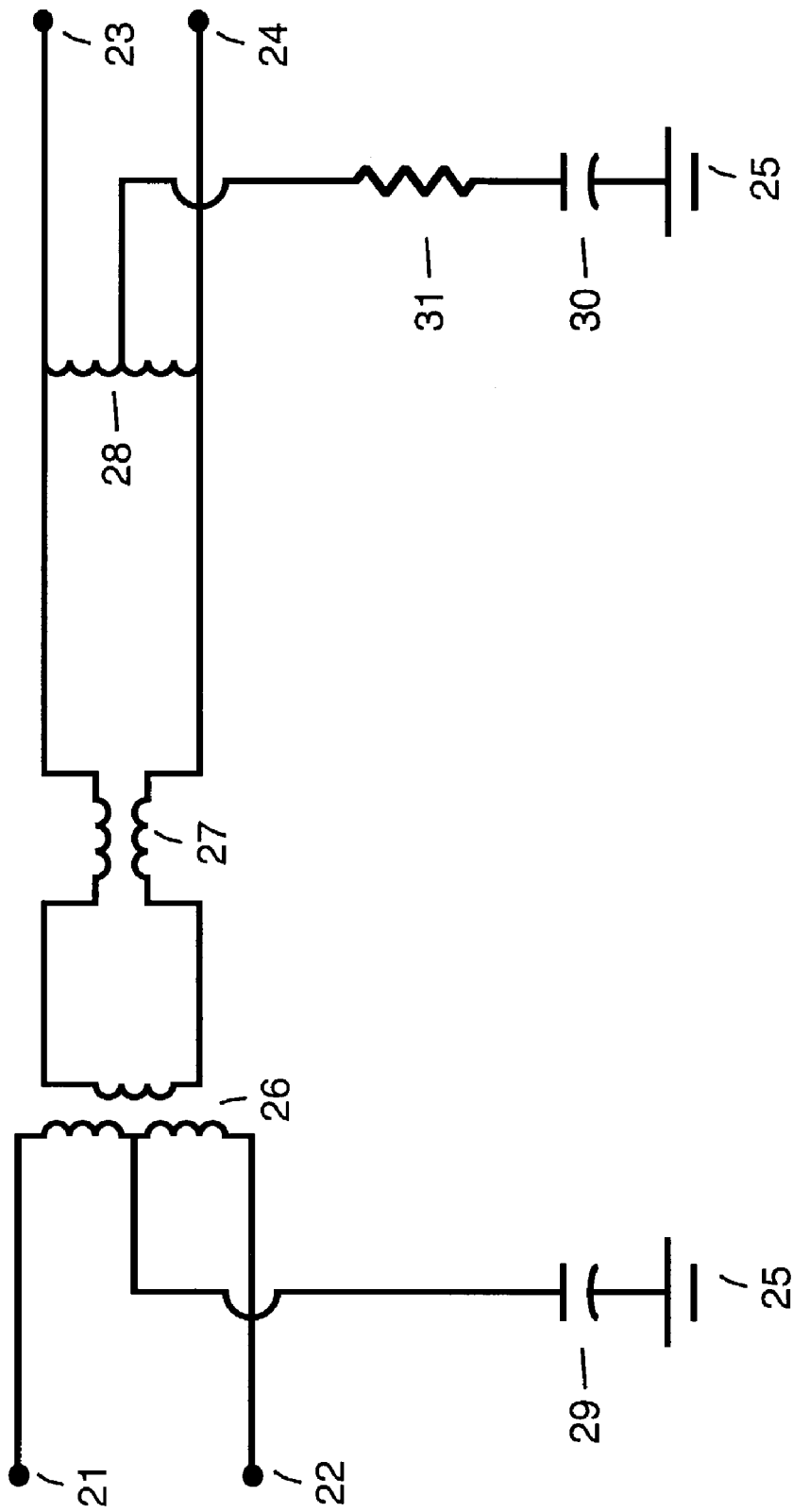
FIG. 1 is a schematic of circuitry within a typical RJ45 jack at the cable side of a transceiver.

FIG. 1 is a schematic of circuitry within a typical RJ45 jack connected to an unshielded twisted pair (UTP) of RJ45 cables at a point 23 and a point 24. The circuitry includes a transformer 26 and a transformer 27. A tap inductance 28, a resistor 31 and a capacitance 30 provide a radio frequency (RF) termination to the chassis that is represented by a ground 25.

In a typical RJ45 jack at the cable side of a transceiver, the signal received from the UTP of RJ45 cable first sees the RF termination to chassis ground 25, which bypasses to chassis ground 25 some of the noise from the signal received from the UTP. The RF termination does not eliminate all noise. The common-mode choke at transformer 27 helps eliminate some of the imbalance. Transformer 26 is a 1:1 transformer that provides direct current (DC) isolation between the UTP of RJ45 cables and the transceiver module connected at points 21 and 22. Transformer 27 does not provide any filtering. A capacitor 29 provides a means to shunt common-mode noise to chassis ground 25.

DESCRIPTION OF THE PREFERRED EMBODIMENT

Figure 2:
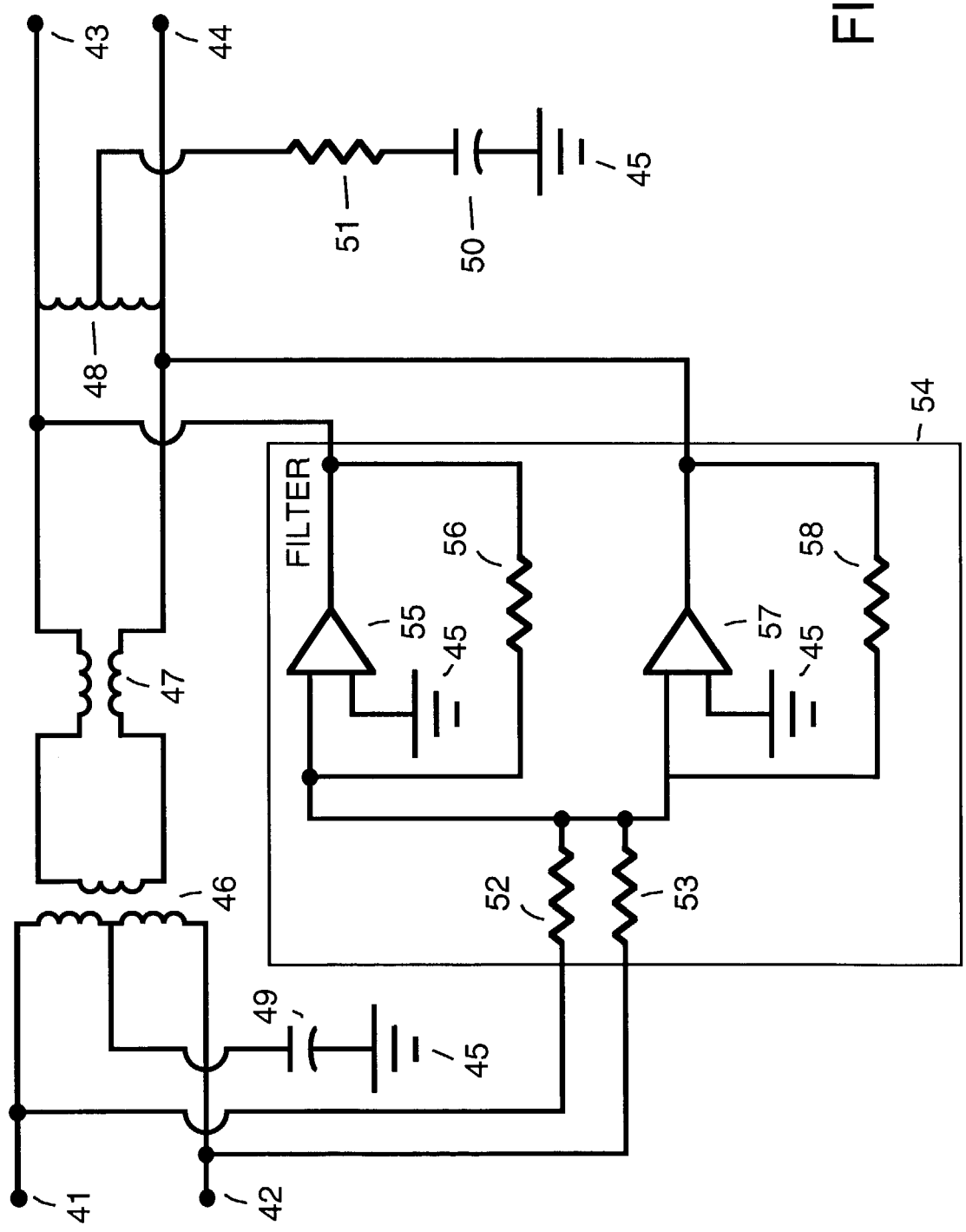
FIG. 2 is a schematic of circuitry within a RJ45 jack at the cable side of a transceiver in accordance with a preferred embodiment of the present invention.

FIG. 2 is a schematic of circuitry within a RJ45 jack at the cable side of a transceiver in accordance with a preferred embodiment of the present invention. The circuitry is connected to an unshielded twisted pair (UTP) of the RJ45 cables at a point 43 and a point 44. The circuitry includes a transformer 46 and a transformer 47. A tap inductance 48, a resistance 51 and a capacitance 50 provides a radio frequency (RF) termination to the chassis, which is represented by a ground 45.

While various preferred embodiments of the present invention are described referring to an unshielded twisted pair (UTP) of RJ45 cables, alternative embodiments of the present invention can use other types of cable with differential signaling, such as a shielded twisted pair (ScTP).

The signal received from the UTP of RJ45 cable first sees the RF termination to chassis ground 45, which bypasses to chassis ground 45 some of the noise from the signal received from the UTP. The common-mode choke at transformer 47 helps eliminate some of the imbalance. Transformer 46 is a 1:1 transformer that provides direct current (DC) isolation between the UTP of RJ45 cables and the transceiver module connected at points 41 and 42. Transformer 46 does not provide any filtering. A capacitance 49 provides a means to shunt common-mode noise to signal ground 45.

Imbalance in the signal that remains after transformer 46 is eliminated by a feedback cancellation (high-pass) filter 54. Feedback cancellation filter 54 provides feedback and cancellation of any remaining undesirable common-mode noise. Cancellation filter 54 includes an operational amplifier (op-amp) 55, a feedback resistance 56, an op-amp 57 a feedback resistance 58, a resistance 52 and a resistance 53, connected as shown.

The input to each of op-amp 55 and op-amp 57 is the sum of the voltages on the differential lines (i.e., at points 41 and 42). Each of op-amp 55 and op-amp 57 has a voltage gain of 0.5. Thus, the cancellation on each differential line is one half of the sum of the common mode voltages on each line.

For example, resistance 51 is implemented by a 75 ohm resistor. Capacitance 50 is implemented by a 0.001 microfarad capacitor. Capacitance 49 is implemented by a 0.1 microfarad capacitor. Feedback resistance 56 and feedback resistance 58 have equal values that are large enough so as not to disturb the signal on the lines between transformer 67 and tap inductance 68. For example, feedback resistance 56 and feedback resistance 58 each have a value of 100 times the line impedance (e.g., 100 ohms), that is 10 kilohms. Resistance 52 and resistance 53 need to have values twice the value of resistance 56 and 58, respectively, so as to get a gain of 0.5.

While shown implemented as a high-pass filter, as will be understood by persons of ordinary skill in the art, feedback cancellation filter 54 can also be implemented as a bandpass filter or a low-pass filter. An RJ45 connector is a low-pass filter for the common mode noise, so the noise that reaches points 41 and 42 is in the passband of the RJ45 connector. Thus the only needed additional cancellation is performed in the same passband as that of the RJ 45 connector.

Figure 3:
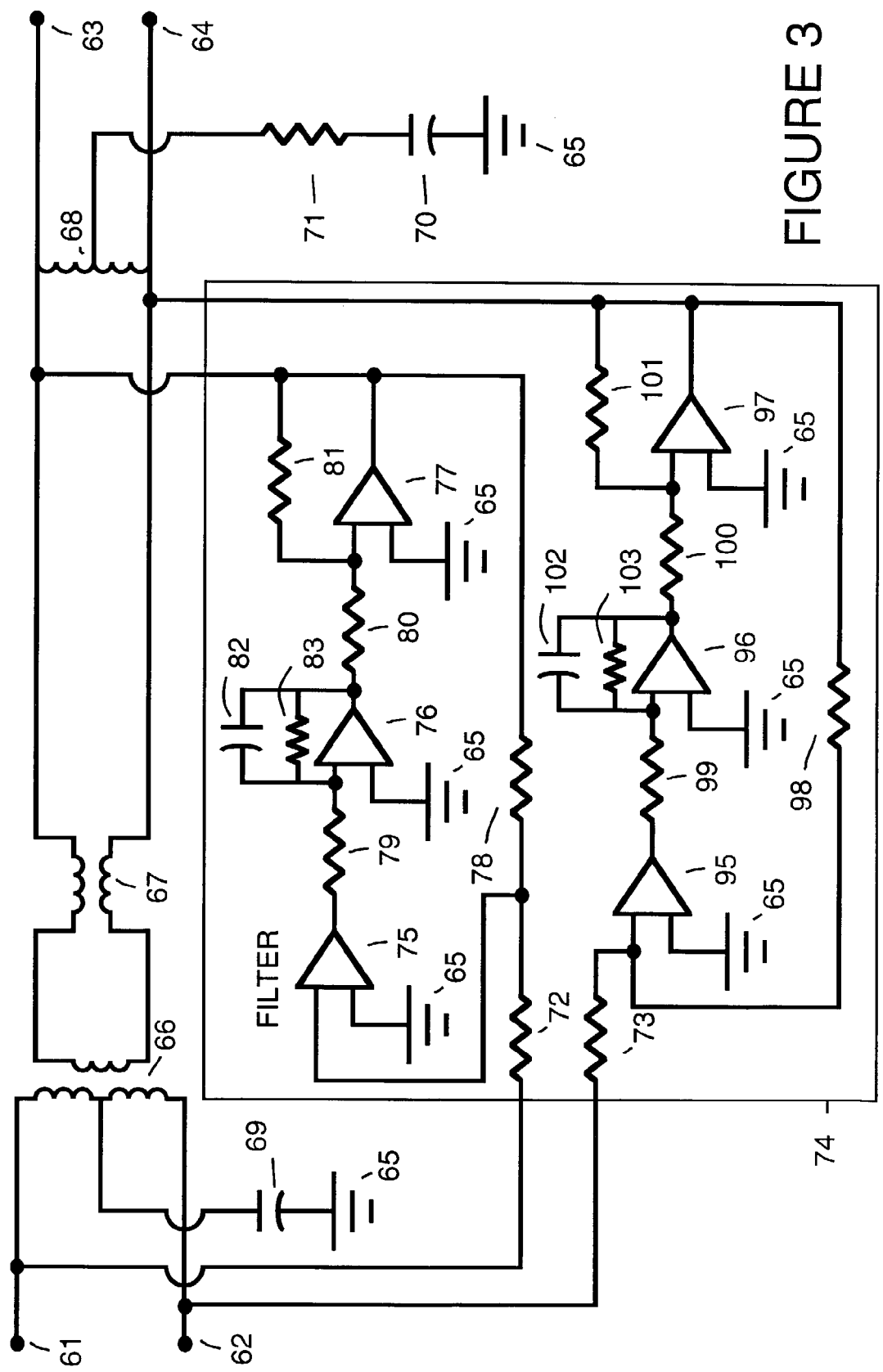
FIG. 3 is a schematic of circuitry within a RJ45 jack at the cable side of a transceiver in accordance with another preferred embodiment of the present invention.

FIG. 3 is a schematic of circuitry within a RJ45 jack at the cable side of a transceiver in accordance with another preferred embodiment of the present invention. The circuitry is connected to an unshielded twisted pair (UTP) of the RJ45 cables at a point 63 and a point 64. The circuitry includes a transformer 66 and a transformer 67. A tap inductance 68, a resistance 71 and a capacitance 70 provides a radio frequency (RF) termination to the chassis, which is represented by a ground 65.

The signal received from the UTP of RJ45 cable first sees the RF termination to chassis ground 65, which bypasses to chassis ground 65 some of the noise from the signal received from the UTP. The common-mode choke at transformer 67 helps eliminate some of the imbalance. Transformer 66 is a 1:1 transformer that provides direct current (DC) isolation between the UTP of RJ45 cables and the transceiver module connected at points 61 and 62. Transformer 66 does not provide any filtering. A capacitance 69 provides a means to shunt common-mode noise to signal ground 65.

Imbalance in the signal that remains after transformer 66 is eliminated by a feedback cancellation filter 74. Feedback cancellation filter 74 provides feedback and cancellation of any remaining undesirable common-mode noise. Cancellation filter 74 includes an operational amplifier (op-amp) 75, an op-amp 76, an op-amp 77, a resistance 78, a resistance 79, a resistance 80, a resistance 81, a resistance 72 and a capacitance 82 connected as shown. Cancellation filter 74 also includes an op-amp 95, an op-amp 96, an op-amp 97, a resistance 98, a resistance 99, a resistance 100, a resistance 101, a resistance 73 and a capacitance 102 connected as shown.

The input to op-amp 75 and op-amp 95 is the sum of the voltages at points 61 and 62. Op-amp 75 and op-amp 95 each have a gain of −0.5. Op-amp 76 and op-amp 96 each function as a low-pass filter. Op-amp 76 and op-amp 96 each have unity gain. Op-amp 77 and op-amp 97 are present to add stability. Op-amp 77 and op-amp 97 have unity gain.

For example, resistance 71 is implemented by a 75 ohm resistor. Capacitance 70 is implemented by a 0.001 microfarad capacitor. Capacitance 69 is implemented by a 0.1 microfarad capacitor.

The resistor values for resistance 81, resistance 101, resistance 78 and resistance 98 need to be large enough so as not to disturb the signal on the lines between transformer 67 and tap inductance 68. For example, resistance 81, resistance 101, resistance 78 and resistance 98 each have a value of 100 times the line impedance (e.g., 100 ohms), that is 10 kilohms.

The value of resistance 80 and resistance 100 need to be equal in value to resistance 81 and resistance 101 for unity gain. For example, resistance 80 and Resistance 72 and resistance 73 need to have values twice the value of resistance 78 and 98, respectively, so as to get a gain of −0.5. For example, resistance 72 and resistance 73 are each implemented with a 20 kilohm resistor.

Resistance 83 and capacitance 82 are chosen to set the high end of the low-pass filter using the formula ½ πRC. Likewise, resistance 103 and capacitance 102 are chosen to set the high end of the low-pass filter using the formula ½ πRC. The high end of the low-pass filter needs to be the same as that of the RJ45 connector. In practice, the RJ45 connector has a high-end frequency on the order of a couple of hundred MHz. So, for example, resistance 83 and resistance 103 are each implemented using a 100 ohm resistor, and capacitance 82 and capacitance 102 are each implemented using a 5 picofarad capacitor.

Resistance 79 and resistance 99 need to be equal to resistance 83 and resistance 103 for unity gain. For example, resistance 79 and resistance 99 are each implemented with a 100 ohm resistor. The addition of the final op amp stage in the "low-pass filter" implementation shown in FIG. 3 enhances the stability of the low-pass filter.

In each disclosed embodiment of the present invention, the transmission distance of the transceiver is increased without increasing the signal level. Additionally, noise immunity is enhanced. The disclosed embodiments of feedback cancellation filters can be easily integrated and manufactured into an RJ45 connector.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A circuit connected between a module and a pair of wires, the circuit comprising:

a first connection line for connection to a first wire in the pair of wires;

a second connection line for connection to a second wire in the pair of wires;

radio frequency termination circuitry coupled between the first connection line and the second connection line;

a first transformer having a first inductance and a second inductance, a first end of the first inductance being coupled to the first connection line and a first end of the second inductance being coupled to the second connection line;

a second transformer including:

a first inductance, the first inductance of the second transformer being coupled between a second end of the first inductance of the first transformer and a second end of the second inductance of the first transformer, and a second inductance that includes a tap line; and, a feedback cancellation filter coupled to the first end of the second inductance of the second transformer, the second end of the second inductance of the second transformer, the first connection line and the second connection line, the feedback cancellation filter being used to cancel common-mode noise on the first connection line and the second connection line.

2. A circuit as in claim 1 wherein the feedback cancellation filter is a high-pass filter.

3. A circuit as in claim 1 wherein the feedback cancellation filter is a low-pass filter.

4. A circuit as in claim 1 wherein the tap line is connected to a ground via a capacitance.

5. A circuit as in claim 1 wherein the radio frequency termination circuitry comprises:
   an inductor connected between the first connection line and the second connection line, the inductor including a tap line that is connected through a resistance and a capacitance to a ground.

6. A circuit as in claim 1 wherein the feedback cancellation filter includes an operational amplifier with a feedback resistance connected in parallel and an input resistance connected in series.

7. A circuit as in claim 1 wherein the feedback cancellation filter comprises:
   a first operational amplifier with a first feedback resistance connected in parallel and a first input resistance connected in series; and,
   a second operational amplifier with a second feedback resistance connected in parallel and a second input resistance connected in series.

8. A circuit as in claim 1:
   wherein the tap line is connected to a ground via a capacitance;
   wherein the radio frequency termination circuitry includes an inductor connected between the first connection line and the second connection line, the inductor including a tap line that is connected through a first resistance and a fourth capacitance to the ground; and,
   wherein the feedback cancellation filter comprises:
      a first operational amplifier with a first feedback resistance connected in parallel and a first input resistance connected in series, and
      a second operational amplifier with a second feedback resistance connected in parallel and a second input resistance connected in series.

9. A circuit as in claim 1 wherein the feedback cancellation filter is a bandpass filter.

10. A circuit connected between a module and a pair of wires, the circuit comprising:
    a first connection line for connection to a first wire in the pair of wires;
    a second connection line for connection to a second wire in the pair of wires;
    a first transformer having a first inductance and a second inductance, a first end of the first inductance being coupled to the first connection line and a first end of the second inductance being coupled to the second connection line;
    a second transformer including:
       a first inductance, the first inductance of the second transformer being coupled between a second end of the ffrst inductance of the first transformer and a second end of the second inductance of the first transformer, and
       a second inductance that includes a tap line; and,
    a feedback cancellation filter coupled to both ends of the second inductance of the second transformer, the first connection line and the second connection line, the feedback cancellation filter being used to cancel common-mode noise on the first connection line and the second connection line.

11. A circuit as in claim 10 wherein the feedback cancellation includes an operational amplifier with a feedback resistance connected in parallel and an input resistance connected in series.

12. A circuit as in claim 10 wherein the feedback cancellation filter is a high-pass filter.

13. A circuit as in claim 10 wherein the feedback cancellation filter is a low-pass filter.

14. A circuit as in claim 10 wherein the tap line is connected to a ground via a capacitance.

15. A circuit as in claim 10 wherein the feedback cancellation filter comprises:
    a first operational amplifier with a first feedback resistance connected in parallel and a first input resistance connected in series, and
    a second operational amplifier with a second feedback resistance connected in parallel and a second input resistance connected in series.

16. A circuit as in claim 10 wherein the feedback cancellation filter is a bandpass filter.

17. A circuit connected between a module and a pair of wires, the circuit comprising:
    a first connection means for connection to a first wire in the pair of wires;
    a second connection means for connection to a second wire in the pair of wires;
    a first transformer means for providing a transformer function, the first transformer means having a first inductance means for providing inductance and a second inductance means for providing inductance, a first end of the first inductance means being coupled to the first connection means and a first end of the second inductance means being coupled to the second connection means;
    a second transformer means for providing a transformer function, the second transformer means including:
       a first inductance means, the first inductance means of the second transformer means being coupled between a second end of the first inductance means of the first transformer means and a second end of the second inductance means of the first transformer means, and
       a second inductance means for providing inductance, the second inductance means including a tap means for tapping the second inductance; and,
    a feedback cancellation filter means for canceling common-mode noise on the first connection means and the second connection means, the feedback cancellation filter means being coupled to second inductance means of the second transformer means, the first connection means and the second connection means.

18. A circuit as in claim 17 additionally comprising:
    radio frequency termination circuitry coupled between the first connection means and the second connection means.

19. A circuit as in claim 17 additionally comprising radio frequency termination circuitry coupled between the first connection means and the second connection means, the radio frequency termination circuitry including an inductor connected between the first connection means and the second connection means, the inductor including a tap means that is connected through a resistance and a capacitance to a ground.

20. A circuit as in claim 17 wherein the feedback cancellation filter means is a high-pass filter.

21. A circuit as in claim 17 wherein the feedback cancellation filter means is a low-pass filter.

22. A circuit as in claim 17 wherein the feedback cancellation filter means is a bandpass filter.

* * * * *

UNITED STATES PATENT AND TRADEMARK OFFICE
CERTIFICATE OF CORRECTION

PATENT NO. : 7,180,950 B2  Page 1 of 1
APPLICATION NO. : 10/286545
DATED : February 20, 2007
INVENTOR(S) : Andy Engel It is certified that error appears in the above-identified patent and that said Letters Patent is hereby corrected as shown below:

In Claim 10, Col. 5 line 54 delete "ffrst" and insert -- first --, therefor.

Signed and Sealed this

Eighth Day of July, 2008

JON W. DUDAS
*Director of the United States Patent and Trademark Office*